United States Patent
Boswell et al.

(10) Patent No.: US 10,738,625 B2
(45) Date of Patent: Aug. 11, 2020

(54) BLADED DISC AND METHOD OF MANUFACTURING THE SAME

(71) Applicant: ROLLS-ROYCE plc, London (GB)

(72) Inventors: John H. Boswell, Derby (GB); Andrew R. Walpole, Derby (GB)

(73) Assignee: ROLLS-ROYCE plc, London (GB)

( * ) Notice: Subject to any disclaimer, the term of this patent is extended or adjusted under 35 U.S.C. 154(b) by 173 days.

(21) Appl. No.: 15/878,785

(22) Filed: Jan. 24, 2018

(65) Prior Publication Data
US 2018/0209281 A1    Jul. 26, 2018

(30) Foreign Application Priority Data
Jan. 25, 2017 (GB) .................... 1701236

(51) Int. Cl.
*F01D 5/30* (2006.01)
*B23K 20/12* (2006.01)
(Continued)

(52) U.S. Cl.
CPC ............ *F01D 5/3061* (2013.01); *B23K 20/02* (2013.01); *B23K 20/122* (2013.01); *B23P 15/04* (2013.01);
(Continued)

(58) Field of Classification Search
CPC . F01D 5/3061; F01D 5/02; F01D 5/12; F01D 5/34; F01D 5/025; F01D 5/28; F05D 2220/32; F05D 2230/236; F05D 2230/239; F05D 2300/175; Y02T 50/672; B23K 20/02; B23K 20/122; B23P 15/04
(Continued)

(56) References Cited

U.S. PATENT DOCUMENTS 6,326,089 B1 * 12/2001 Claxton ............... B23K 1/0008
228/113
6,551,372 B1    4/2003 Ewing et al.
(Continued)

FOREIGN PATENT DOCUMENTS

DE   102010051534 A1   5/2012
EP          0368642     5/1990
(Continued)

OTHER PUBLICATIONS

Great Britain Search Report issued in GB Patent Application No. 1701236.0 dated Jul. 28, 2017.
(Continued)

*Primary Examiner* — J. Todd Newton
(74) *Attorney, Agent, or Firm* — Shumaker & Sieffert, P.A.

(57) ABSTRACT

A method (56) for fabricating an integral assembly (24) is disclosed. The method comprises providing (56) a first workpiece (26) having a first surface (46) and a second workpiece (28) having a second surface (50), performing a first bonding process between the first surface (46) of the first workpiece (26) and the second surface (50) of the second workpiece (28) to form a sub-assembly workpiece (48), and performing a second bonding process between a third surface (52) of the sub-assembly workpiece (48) and a fourth surface (54) of a third workpiece (30) to form the integral assembly (24). The material properties of the first workpiece (26) are different from material properties of the third workpiece (30).

15 Claims, 6 Drawing Sheets

(51) Int. Cl.
*F01D 5/02* (2006.01)
*B23K 20/02* (2006.01)
*B23P 15/04* (2006.01)
*F01D 5/34* (2006.01)
*F01D 5/12* (2006.01)

(52) U.S. Cl.
CPC ............... *F01D 5/02* (2013.01); *F01D 5/025* (2013.01); *F01D 5/12* (2013.01); *F01D 5/34* (2013.01); *F05D 2220/32* (2013.01); *F05D 2230/236* (2013.01); *F05D 2230/239* (2013.01); *F05D 2300/175* (2013.01); *Y02T 50/672* (2013.01)

(58) Field of Classification Search
USPC ..................................................... 416/213 R
See application file for complete search history.

(56) References Cited

U.S. PATENT DOCUMENTS

| | | | | |
|---|---|---|---|---|
| 10,384,302 | B2* | 8/2019 | March | ..................... F01D 5/005 |
| 2005/0005445 | A1 | 1/2005 | Ferte et al. | |
| 2005/0084381 | A1* | 4/2005 | Groh | .................... B23K 20/129 |
| | | | | 416/244 A |
| 2011/0065973 | A1 | 3/2011 | Fernie et al. | |
| 2014/0140859 | A1* | 5/2014 | Bales | ........................ F01D 5/28 |
| | | | | 416/96 R |
| 2017/0022827 | A1* | 1/2017 | Waldman | .............. F01D 5/3061 |
| 2017/0145837 | A1* | 5/2017 | Schloffer | ............ B23K 20/1205 |
| 2017/0314401 | A1* | 11/2017 | Schloffer | ............... B23K 26/21 |
| 2018/0209281 | A1* | 7/2018 | Boswell | ................ B23K 20/02 |

FOREIGN PATENT DOCUMENTS

| | | | | |
|---|---|---|---|---|
| GB | 1224759 | | 3/1971 | |
| GB | 1224759 | A * | 3/1971 | .......... F01D 5/3061 |
| WO | 2007144557 | | 12/2007 | |

OTHER PUBLICATIONS

Extended Search Report from counterpart European Application No. 18150268.3, dated Jul. 5, 2018, 5 pp.

* cited by examiner

BLADED DISC AND METHOD OF MANUFACTURING THE SAME

CROSS-REFERENCE TO RELATED APPLICATIONS

This disclosure claims the benefit of GB Patent Application No. GB 1701236.0, filed on 25 Jan. 2017, which is hereby incorporated herein in its entirety.

FIELD OF THE INVENTION

The present disclosure relates to a bladed disc and a method of manufacturing the same.

BACKGROUND

Gas turbine engines are employed in a variety of applications, such as aircraft, and marine vessels, among others. The gas turbine engines generate a thrust from a fluid flow by first compressing an intake air within a compression unit. The compression unit utilizes a series of bladed discs or bladed rings for compressing the intake air. The compression unit supplies the compressed air to be mixed with a fuel mixture for combustion in a combustion unit. The resulting hot, high pressure gaseous mixture is expanded through a turbine portion to extract energy which drives the compressors and a propulsor such as a fan or propeller. Energy may also be extracted in the form of electrical power.

The bladed discs are a unitary construction having a disc (or a drum) and a number of blades spaced apart from each other. If the disc and the blade are integrated as a single piece, weight saving may be achieved. As a result, non-mechanical methods of joining the blades have been proposed, wherein the bladed discs are machined from a single forged piece. However, such methods suffer from manufacturing challenges due to less efficient utilization of expensive materials and expensive forging machinery.

Due to technical challenges associated with a high temperature environment, the bladed discs are required to be fabricated with dissimilar materials. However, there are technical challenges in joining two dissimilar materials. For example, joining of the dissimilar materials, i.e. a blade and disc alloys having different crystal structures, differences in thermal processing (i.e. heat treatment) requirements and difficulty in joining using a solid state or melting processes, such as a fusion welding. Further, the fusion welding may give unfavorable post weld mechanical properties due to a heat affected zone and mixing of alloys, increased grain size and lack of post weld homogenisation heat treatment. Furthermore, the dissimilar materials have different characteristics, i.e. weld induced residual stress or optimum material condition (e.g. aging) and hence there are always challenges in joining the dissimilar materials. Furthermore, the welding procedures of the dissimilar materials may require large and costly setups. Therefore, there is a need for an improved bladed disc that is fabricated from the dissimilar materials and further a method of manufacturing the same is proposed.

SUMMARY OF THE INVENTION

The present disclosure concerns a bladed disc for a gas turbine engine. In some examples, a bladed disc and methods for fabricating the same are disclosed.

The bladed disc (also called an integral assembly) may be used in a low pressure turbine, intermediate pressure or a high pressure turbine. It may also find application in the compressor section of the gas turbine.

The high pressure turbine is exposed to the hottest, highest pressure air, and the low pressure turbine is subjected to cooler, lower pressure air.

According to various, but not necessarily all, embodiments of the disclosure there is provided a method for fabricating an integral assembly, the method comprising: providing a first workpiece having a first surface and a second workpiece having a second surface;
performing a diffusion bonding process between the first surface of the first workpiece and the second surface of the second workpiece to form a sub-assembly workpiece; and performing a friction welding process between a third surface of the sub-assembly workpiece and a fourth surface of a third workpiece to form the integral assembly, wherein material properties of the first workpiece being different from material properties of the third workpiece.

According to various, but not necessarily all, embodiments of the disclosure there is provided a method of fabricating a bladed disc for a gas turbine, the method comprises providing a sub-assembly workpiece formed from a first workpiece bonded to a second workpiece; and performing a second bonding process between a third surface of the sub-assembly workpiece and a fourth surface of a third workpiece to form the bladed disc, wherein material properties of the first workpiece being different from material properties of the third workpiece.

According to various, but not necessarily all, embodiments of the disclosure there is provided a bladed disc. The bladed disc comprises a first workpiece; a second workpiece; and a third workpiece, wherein the first workpiece is coupled to the third workpiece using the second workpiece to form the bladed disc, the second workpiece is disposed in between the first workpiece, and the third workpiece to facilitate coupling of the first workpiece, and the third workpiece using each of a first bonding process and a second bonding process, material properties of the first workpiece being different from material properties of the third workpiece.

The bladed disc may be manufactured such that the material properties of the first workpiece are different from material properties of the third workpiece.

For blades, that have a relatively low volume, the residual stress imparted by friction welding may be difficult to relieve by heat treatment particularly as the alloys used have high temperature capability. Use of a second workpiece isolates the first workpiece from the heat of the friction welding and may be a material that is simpler to treat to remove residual stress.

The bladed disc may be a fan bladed disc, a compressor section bladed disc or any other bladed disc.

The integral assembly may be selected from a group comprising bladed discs, bladed drums and/or bladed rings.

The first workpiece may be a blade, and the third workpiece may be a disc.

The first bonding process comprises a diffusion bonding. The diffusion bonding may utilise a pressure greater than 1 MPa to facilitate adequate bonding at a temperature of 1000° C. or greater.

The second bonding process may comprise a linear friction welding, an orbital friction welding, stir welding or other friction welding methods.

The first workpiece and the second workpiece may be positioned such that the first surface of the first workpiece abuts the second surface of the second workpiece before carrying out the first bonding process.

The first work piece and the second work piece may be processed for alignment, surface treatments, heat treatment processes, non-destructive examination (NDE) before carrying out the first bonding process.

The first workpiece may be manufactured from a single-crystal nickel super alloy, or a directional solidification (DS) super alloy.

The first work piece may be manufactured from alloys selected from CMSX-4®, CMSX-2®, MAR-M002®, CM247® or IN718®.

The single-crystal nickel super alloy, or a directional solidification (DS) super alloy may be diffusion bonded at a temperature between 10000° C. and 1300 C. for up to 4 hours.

The second workpiece may be manufactured from wrought, or cast material.

The third workpiece may be manufactured from IN718®, or a single-crystal nickel super alloy, or a directional solidification (DS) super alloy.

The bladed disc may be processed for surface finishing processes, flash removal processes, heat treatment processes, non-destructive examinations (NDE).

According to various, but not necessarily all, embodiments of the disclosure there is provided a gas turbine engine comprising the bladed disc as described in any of the preceding paragraphs.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

In the following description, the wording 'contact', 'abut', 'connect' and 'couple', and their derivatives, mean operationally contacting, abutting, connecting and coupling. It should be appreciated that any number of intervening components may exist, including no intervening components.

Figure 1:
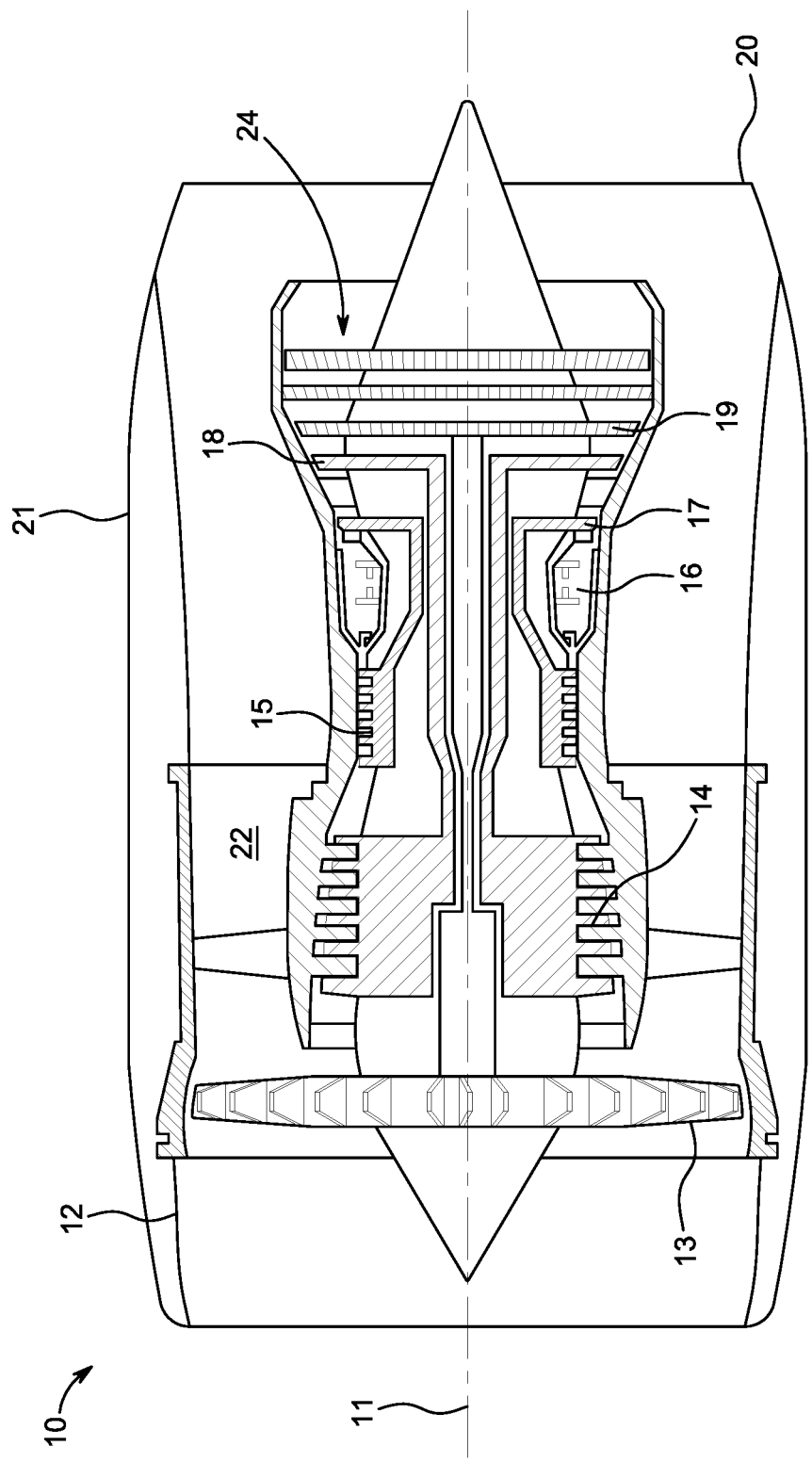
FIG. 1 illustrates a sectional view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, a combustion equipment 16, a high-pressure turbine 17, an intermediate pressure turbine 18, a low-pressure turbine 19 and an exhaust nozzle 20. A nacelle 21 generally surrounds the engine 10 and defines both the air intake 12 and the exhaust nozzle 20.

The gas turbine engine 10 works in the conventional manner so that air entering the air intake 12 is accelerated by the propulsive fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high pressure turbine 17, the intermediate pressure turbine 18 and the low-pressure turbine 19 before being exhausted through the exhaust nozzle 20 to provide additional propulsive thrust. The high pressure turbine 17, the intermediate pressure turbine 18 and the low-pressure turbine 19 drive respectively the high pressure compressor 15, the intermediate pressure compressor 14 and the propulsive fan 13, each by suitable interconnecting shaft.

Figure 2:
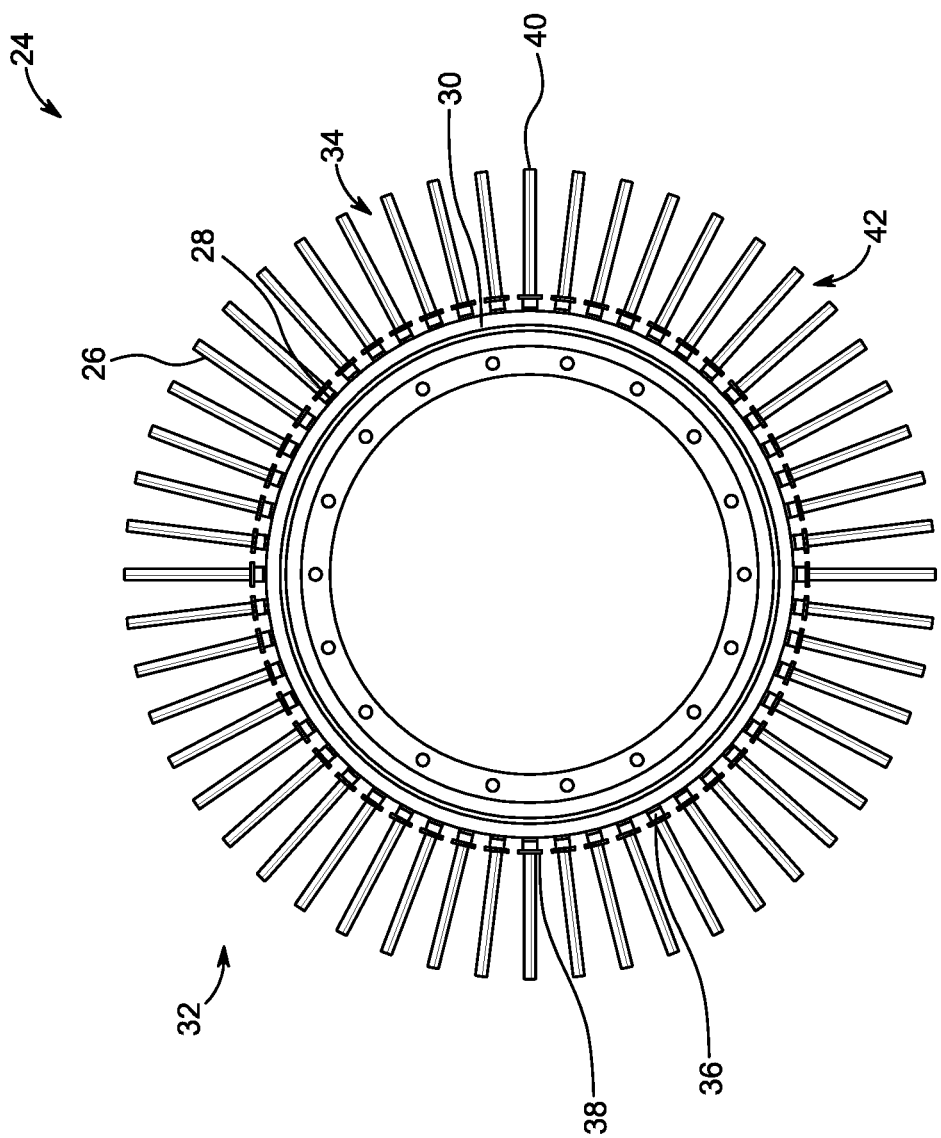
FIG. 2 illustrates a side view showing a bladed disc assembly.

The high-pressure turbine 17, the intermediate pressure turbine 18, and the low-pressure turbine 19 may all be formed as a bladed disc 24. The bladed disc 24 is shown in FIG. 2 and comprises a disc 30 integrally formed with multiple blade 26 on its peripheral surface. The method of the present disclosure finds particular utility in manufacturing the bladed disc 24 when the disc 30 and the blade 24 have different material properties.

Other gas turbine engines to which the present disclosure may be applied may have alternative configurations. The gas turbine engines disclosed herein may be utilized across various applications, i.e. an aerospace or marine gas turbines, among others. By way of example such engines may have an alternative number of interconnecting shafts (e.g. two) and/or an alternative number of compressors and/or turbines. Further the engine may comprise a gearbox provided in the drive train from a turbine to a compressor and/or fan.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

Figure 3:
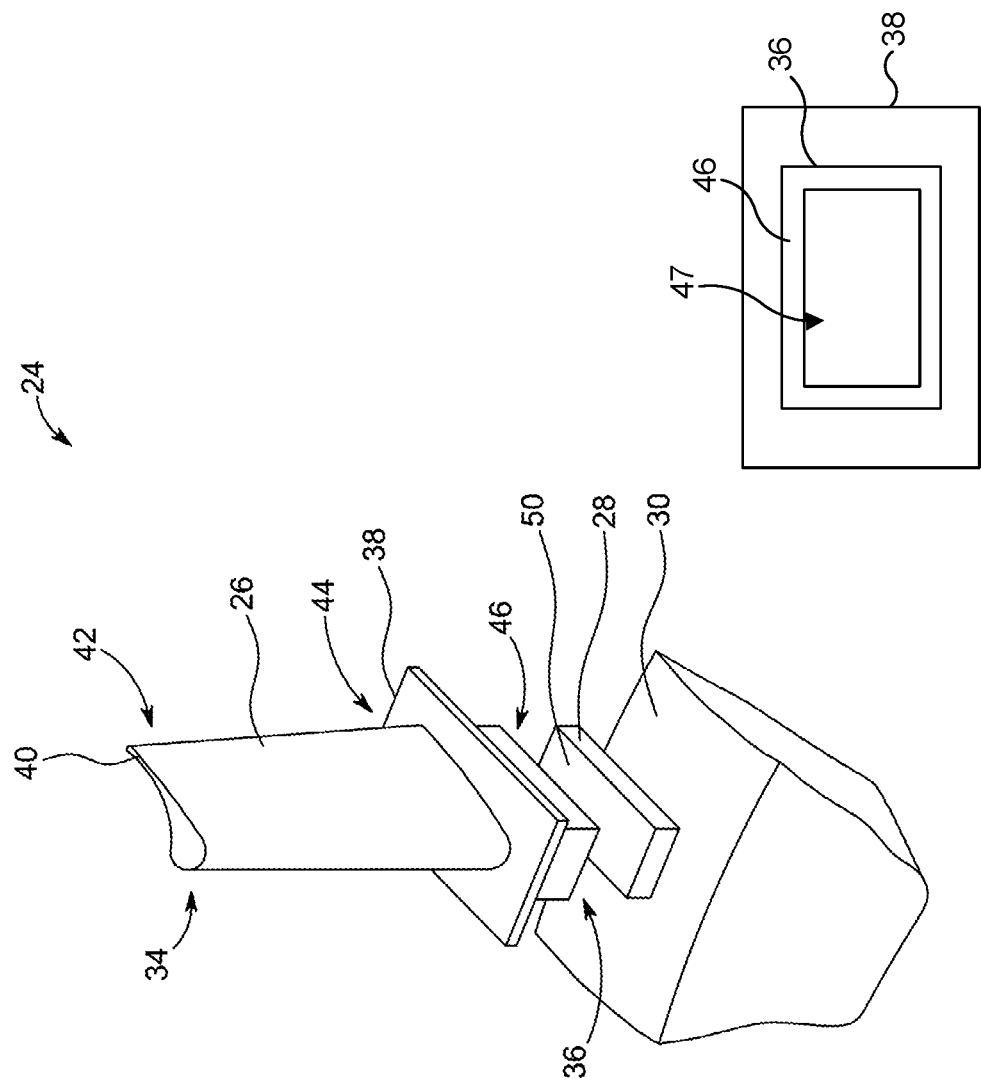
FIG. 3A illustrates a perspective view showing a first workpiece, a second workpiece and a third workpiece to form a bladed disc
FIG. 3B illustrates a plan view of the first workpiece, including a first surface of the first workpiece.
Figure 4:
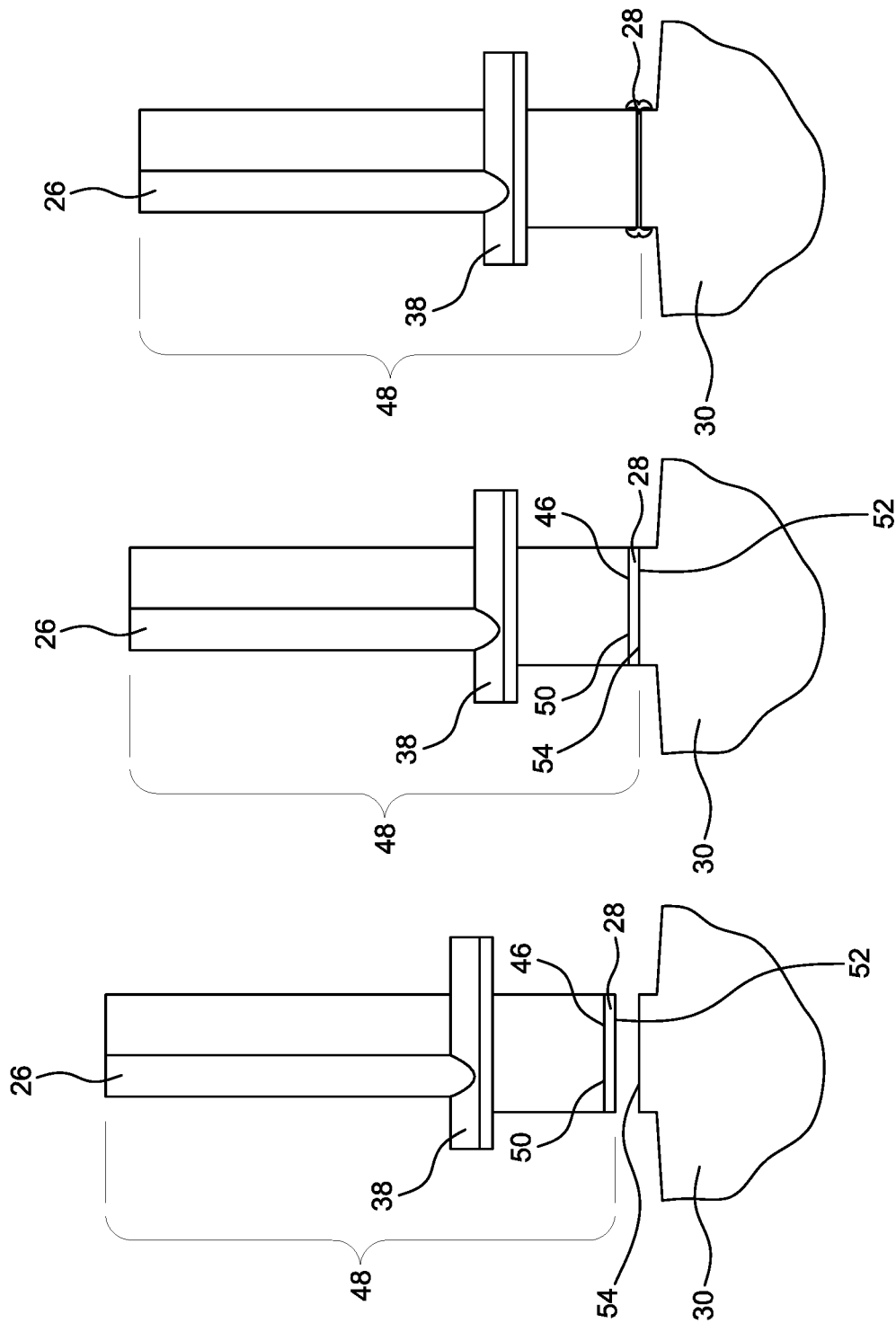
FIGS. 4A, 4B and 4C illustrate perspective views of a sub-assembly workpiece and the third workpiece combined to form the bladed disc.

With reference to FIGS. 2, 3A, and 3B, as used herein, terms "bladed disc assembly" or "bladed disc" or "integral assembly" are used herein to refer to any gas turbine engine 10 components which includes a hub, i.e. the disc 30 having the multiple blades 26 integral therewith. Such components are sometimes also referred to as "bladed disc" or "integrally bladed rotor". The present disclosure is especially useful for bladed discs used in the gas turbine engine 10, but is applicable to any kind of bladed disc structure. The term "bladed disc assembly 24" may be interchangeably used with "the bladed disc 24" within the specification without departing the meaning and scope of the disclosure. The term "first workpiece 26", "second workpiece 28", "third workpiece 30" may be interchangeably used with terms "blade 26", "spacer 28" and "disc 30" respectively without departing from the meaning and scope of the disclosure. In accordance with the present disclosure, the bladed disc assembly 24 includes a first workpiece 26 (i.e. the blade 26), a second workpiece 28 (i.e. a spacer 28) and a third workpiece 30 (i.e. the disc 30) around the circumference of which is disposed of the multiple blades 26 (shown as 32) in an annular array. The plurality of blades 26 extend from the disc 30 in an outwardly radial and axial direction. As will be appreciated by those skilled in the art, the first workpiece 26 may have varying configurations, i.e. shape, thickness without departing from the meaning and scope of the disclosure. The number and orientation of the first workpiece 26 around the circumference of third workpiece 30 may also vary without departing from the meaning and scope of the disclosure. In an embodiment, material properties of the first workpiece 26 are different from material properties of the third workpiece 30.

With reference to FIGS. 2, 3A, and 3B, the blade 26 comprises an aerofoil 34, a root 36, a platform 38, and a tip 40. The blade 26 is connected to the disc 30 via the root 36. The platform 38 extends axially and circumferentially. The bladed disc assembly 24 has a generally radial structure and, a central bore area (not shown). In operations, the bladed disc assembly 24 is disposed on a central axis (not shown) at the central bore area (not shown) and rotates thereon or rotates with the axis (not shown). The bladed disc assembly 24 further defines an upstream position 42 and a downstream position 44. The upstream position 42 and the downstream position 44 (see FIG. 3A) correspond to the fluid path flow through and across the bladed disc assembly 24. Fluid, and more specifically air, first enters the bladed disc assembly 24 at the upstream position 42. As air passes the bladed disc assembly 24, the air exits via the downstream position 44. Air passing across the bladed disc assembly 24 is pressurized such that the air exiting the bladed disc assembly 24 is at a higher temperature and pressure relative to the air entering the bladed disc assembly 24. The direction of the air flow (not shown) moves across the face of the bladed disc assembly 24, wherein the face being that portion of the bladed disc assembly 24 which is exposed to air flow. In operation, the bladed disc assembly 24 may be disposed within a housing or structure (not shown) which, by close proximity to the blades 26 (shown as 32), assists in placing the air under pressure.

With reference to FIGS. 3A, 3B, 4A, 4B, and 4C, an integral assembly, i.e. the bladed disc 24 is manufactured. The integral assembly 24 is selected from a group comprising bladed discs, bladed drums and/or bladed rings. In an embodiment, the integral assembly 24 is the bladed disc 24. The bladed disc 24 comprises the first workpiece 26, the second workpiece 28 and the third workpiece 30. The first workpiece 26 is coupled to the third workpiece 30 using the second workpiece 28 to form the bladed disc 24. The second workpiece 28 is disposed in between the first workpiece 26, and the third workpiece 30 to facilitate coupling of the first workpiece 26, and the third workpiece 30 using each of a first bonding process and a second bonding process as described in subsequent paragraphs. The material properties of the first workpiece 26 are different from material properties of the third workpiece 30. It will be apparent to one skilled in the art that the first workpiece 26, the second workpiece 28, and the third workpiece 30 may be of any shape, design, or characteristics other than as illustrated here.

The first workpiece 26 includes a first surface 46. The blade 26 may be a single crystal super alloy or a directional solidification (DS) super alloy, such as but not limited to CMSX-4®, CMSX-2®, MAR-M002® or CM247® and other similar super alloys.

As will be appreciated by those skilled in the art, the blade 26 may be manufactured from various other types of alloys, such as Nickle based alloys, Chromium based alloys, Tungsten based alloys, Aluminium based alloys or other metal alloys not described herein without departing from the meaning and scope of the disclosure. The single crystal alloy and casting technology offer a combination of properties for advanced gas turbine engine components. The alloys are designed to produce superior properties for a challenging combination of requirements, such as high temperature creep-strength, fatigue resistance, oxidation resistance, coating performance and retention of performance in thin-walled configurations. The blade 26 is bonded to the second workpiece 28 between the first surface 46, and a second surface 50 using the first bonding process to form the sub-assembly workpiece 48. In an embodiment, the second workpiece 28 is the spacer manufactured from wrought, additive layer manufacture or cast material production technologies. The second workpiece 28 may be of same composition as the third workpiece 30 as described later. The second workpiece 28 may also include materials, but not limited to IN718®, or a single-crystal nickel super alloy, or a directional solidification (DS) super alloy, Waspaloy®, Udimet 720®, or RR1000®. As will be appreciated by those skilled in the art, the second workpiece 28 may be manufactured from various other types of metal alloys such as Nickle based alloys, Chromium based alloys, Tungsten based alloys, Aluminium based alloys or other metal alloys not described herein without departing from the meaning and scope of the disclosure. Further the sub-assembly workpiece 48 is joined with the third workpiece 30 by the second bonding process.

Further, the first surface 46 of the first workpiece 26 is prepared, prior to make the first surface 46 suitable for the first bonding process, by machining away oxide layer and then washing the machined surface with suitable degreasing agents or cleaning agents. Similarly, the second surface 50 of the second workpiece 28 is also prepared for the first bonding process by ensuring that cleaning is done properly. Cleaning of the first workpiece 26 and the second workpiece 28 is helpful for the first bonding process as the surfaces, i.e. the first surface 46 and the second surface 50 need to intersperse into each other with least possible impurities. The first surface 46 of the first workpiece 26 and the second surface 50 of the second workpiece 28 are prepared for bonding process by various other surface finishing techniques which may reduce the asperity (unevenness of surface or roughness). Such techniques are known as polishing, milling, etching etc. In an embodiment, etching is performed for surface preparation, as etching is applicable for some materials, such as Titanium (Ti). As will be appreciated by those skilled in the art, there may be other processes, not limited to etching for surface preparation. As will be appreciated by those skilled in the art, the first surface 46 of the first workpiece 26 and the second surface 50 of the second workpiece 28 may also be processed for alignment, other surface treatments, heat treatment processes, non-destructive examination (NDE) before carrying out the first bonding process as described below.

The first bonding process is a diffusion bonding process which involves surface activated fusion of materials. The diffusion bonding is used to join one material (e.g. single crystal blade) to a layer/spacer of a second (polycrystalline) material which is either the same material as, or a compatible alloy (e.g. a modified version of the same material) with the part to which this sub-assembly is to be joined (e.g. the polycrystalline disc). The diffusion bonding is a solid state type welding in which atoms of the two solid metallic surfaces intersperse into each other with no filler metal. There is no extra weight to the bladed disc assembly 24 as there is no filler material. The diffusion bonding is carried out in a high pressure state in which bonded surfaces are aligned with respect to each other. The diffusion bonding is carried out in many ways one example is by use of a Hot Isostatic Pressure (HIP) vessel. HIP based diffusion bonding allows dissimilar materials to be bonded together to form a metallurgical bond with diffusion occurring on an atomic level. The first surface 46 and the second surface 50 intersperse and join after homogenisation forming into the sub-assembly workpiece 48. Within the HIP vessel, a vacuum tight seal between the first workpiece 26 and the second workpiece 28 is created. Further, the diffusion bonding process is completed by heating the second workpiece 28 and the first workpiece 26 in a vacuum. The surfaces i.e. the first surface 46 and the second surface 50 are heated in a furnace or by electrical resistance and pressure is applied using hydraulic or a pneumatic press. In an embodiment, a pressure greater than 1 MPa is required to facilitate adequate bonding at a temperature of 1000° C. or greater. This temperature and duration of diffusion bonding may vary depending on alloy composition and type, DS and equiaxed alloys may require different temperatures based on the upper aging temperature for the specific alloy. As will be appreciated by those skilled in the art, the temperature and duration for the diffusion bonding for the double aged alloy or any other applicable alloys, not limited to, a single-crystal nickel super alloy, or a directional solidification (DS) super alloy may vary without departing from the meaning and scope of the disclosure. As will be appreciated by those skilled in the art, the first bonding process may use other solid state type welding or any other technique.

With reference to FIGS. 3A, 3B, 4A, 4B, and 4C, the sub-assembly workpiece 48 is formed, when the first workpiece 26 and the second workpiece 28 are bonded together by the first bonding process. Further the sub-assembly workpiece 48 is joined with the third workpiece 30 by the second bonding process as described herein. A third surface 52 of the sub-assembly workpiece 48 is prepared, prior to make the third surface 52 suitable for the second bonding process, by machining away an oxide layer and then washing the machined surface with suitable degreasing agents or cleaning agents. Similarly, a fourth surface 54 of the third workpiece 30 is also prepared for the second bonding process by ensuring that cleaning has been done properly. Cleaning of the sub-assembly workpiece 48 and the third workpiece 30 is helpful for the second bonding process as the surfaces, i.e. the third surface 52 and the fourth surface 54 need to intersperse into each other with least possible impurities. The third surface 52 of the sub-assembly workpiece 48 and the fourth surface 54 of the third workpiece 30 are prepared for the second bonding process by surface finishing techniques which may help reduce the asperity (unevenness of surface or roughness). Such techniques are known as polishing, milling, etching etc. As will be appreciated by those skilled in the art, the third surface 52 of the sub-assembly workpiece 48 and the fourth surface 54 of the third workpiece 30 may be processed for alignment, other surface treatments, heat treatment processes, non-destructive examinations (NDE) before carrying out the second bonding process.

The second bonding process is a solid state welding process for welding the sub-assembly workpiece 48 with the third workpiece 30. In an embodiment, the second bonding process is a linear friction welding or an orbital friction welding. The linear friction welding is processed between the third surface 52 of the sub-assembly workpiece 48 and the fourth surface 54 of the third workpiece 30. The linear friction welding utilized heat generated from friction to couple the sub-assembly workpiece 48 with the third workpiece 30. Friction heats the material to a plastic state in conjunction with an applied force to create the weld. The second bonding process may also be designed in such a way that it ensure that the sub-assembly workpiece 48 having the first workpiece 26 is protected from undesirable heat and stress from the second bonding process. The orbital friction weld may be another welding process for a reliable weld between the sub-assembly workpiece 48 and the third workpiece 30. As will be appreciated by those skilled in the art, the second bonding process may use any other solid state type welding or any other technique.

Figure 5:
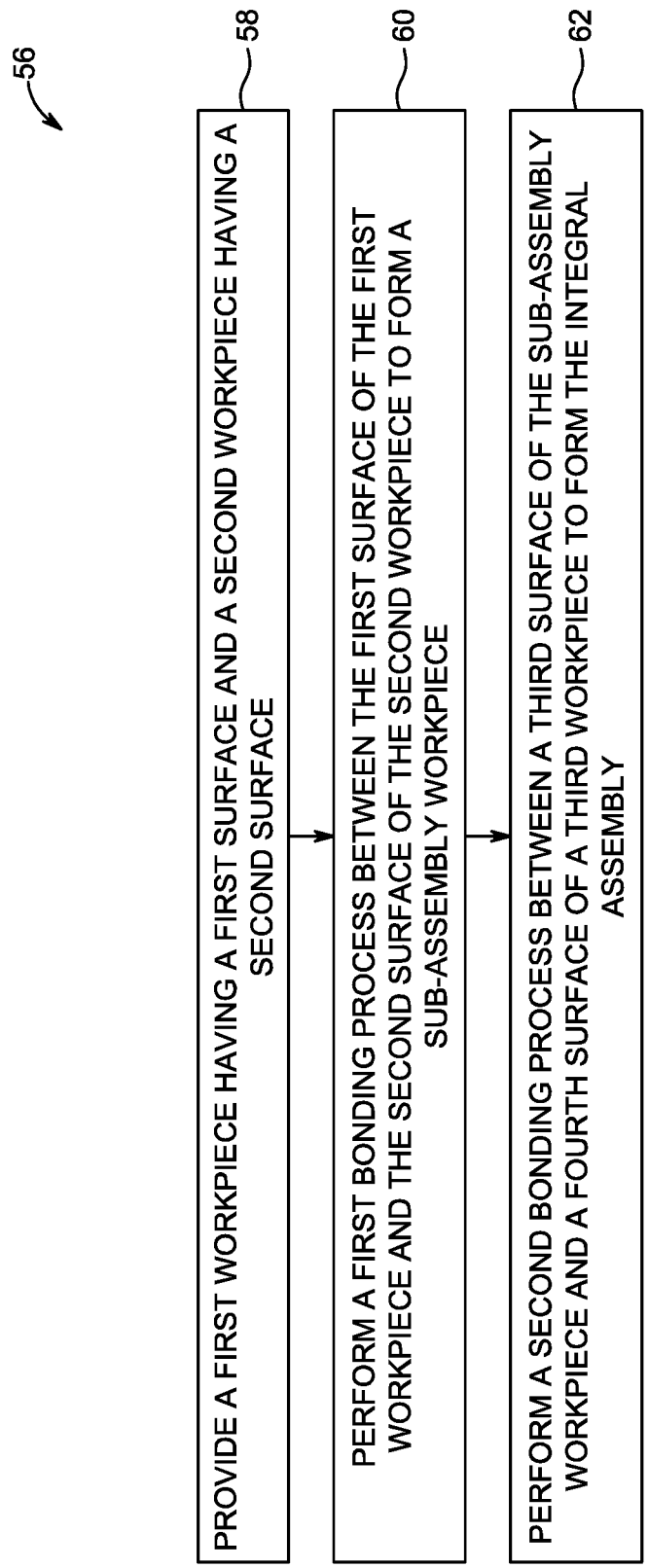
FIG. 5 illustrates a method for fabricating an integral assembly, in accordance with the first embodiment.

Referring to FIG. 5, a method 56 for fabricating the integral assembly 24 is disclosed, and is described in conjunction with FIGS. 1-4.

At step 58, the first workpiece 26 having the first surface 46 and the second workpiece 28 having the second surface 50 are provided. The first surface 46 is abutted with the second surface 50 after each surfaces 46, 50 has undergone surface treatments. The first surface 46 of the first workpiece 26 and the second surface 50 of the second workpiece 28 are prepared for the first bonding process by surface finishing techniques which may help reduce the asperity (unevenness of surface roughness). As will be appreciated by those skilled in the art, the first surface 46 of the first workpiece 26 and the second surface 50 of the second workpiece 28 may be processed for alignment, other surface treatments, non-destructive examinations (NDE) before carrying out the first bonding process.

At step 60, the first bonding process is performed between the first surface 46 of the first workpiece 26 and the second surface 50 of the second workpiece 28 to form the sub-assembly workpiece 48. The first bonding process includes the diffusion bonding process. The first surface 46 and the second surface 50 intersperse and join after homogenisation forming into the sub-assembly workpiece 48. Within the HIP vessel, a vacuum tight seal between the second workpiece 28 and the first workpiece 26 is created. Further, the diffusion bonding process is completed by heating the second workpiece 28 and the first workpiece 26 in a vacuum. The surfaces i.e. the first surface 46 and the second surface 50 are heated in a furnace or by electrical resistance and pressure is applied using hydraulic or a pneumatic press. In an embodiment, a pressure greater than 1 MPa is required to facilitate adequate bonding at a temperature of 1000° C. or greater.

At step 62, a second bonding process is performed between the third surface 52 of the sub-assembly workpiece 48 and the fourth surface 54 of the third workpiece 30 to form the integral assembly 24, i.e. the bladed disc 24. The third surface 52 of the sub-assembly workpiece 48 and the fourth surface 54 of the third workpiece 30 are prepared, prior to make the surfaces 52, 54 suitable for the second bonding process. The second bonding process is a linear friction welding or an orbital friction welding. The linear friction weld achieves a weld by pushing two workpieces, i.e. the sub-assembly workpiece 48 and the third workpiece 30 with respect to each other and producing frictional heat for carrying out the welding. As will be appreciated by those skilled in the art, before usage, the bladed disc 24 may be processed further for surface finishing processes, heat treatment processes, non-destructive examinations (NDE).

Figure 6:
FIG. 6 illustrates a method for fabricating the bladed disc for a gas turbine engine, in accordance with the second embodiment.

Referring to FIG. 6, a method 64 for fabricating the bladed disc 24 for a gas turbine engine 10 is disclosed and is described in conjunction with FIGS. 1-4.

At step 66, the sub-assembly workpiece 48 is provided. The sub-assembly workpiece 48 is formed from the first workpiece 26 bonded to the second workpiece 28. In an embodiment, the sub-assembly workpiece 48 is in a pre-assembled state and is used for coupling with the third workpiece 30 as described below.

At step 68, the second bonding process is performed between the third surface 52 of the sub-assembly workpiece 48 and the fourth surface 54 of the third workpiece 30 to form the bladed disc 24. The third surface 52 of the sub-assembly workpiece 48 and the fourth surface 54 of the third workpiece 30 are prepared, prior to make the surfaces 52, 54 suitable for the second bonding process. The second bonding process is a linear friction welding or an orbital friction welding. The linear friction welding is done between the third surface 52 of the sub-assembly workpiece 48 and the fourth surface 54 of the third workpiece 30. As will be appreciated by those skilled in the art, the bladed disc 24 may be processed further for surface finishing processes, heat treatment processes, flash removal processes, heat treatment processes, other non-destructive examinations (NDE).

The proposed embodiments of the disclosure offer various advantages. The proposed disclosure uses a combination of the first bonding process and the second bonding process for bonding two different materials of varying material properties. Further, the proposed disclosure provides flexibility to use known technology, such as a solid state welding for bonding the blade 26 with the disc 30. The first bonding process has a smaller profile and used for bonding the first workpiece 26 and the second workpiece 28. As a result, there is no potentially deleterious effect on the disc 30 due high temperatures of the diffusion bonding. The second workpiece 28 is bonded to the first workpiece 26 such that there is no requirement of a huge diffusion bonding furnace (or HIP vessel). The proposed techniques may also be used to repair bladed discs, which in service experience very hostile environments and undergo different kinds of damage.

Further, the proposed technology is easily applied to facilitate joining of other structures with internal holes or similar discontinuities e.g. a fan bladed disc, metal-matrix-composite bladed disc. The aerofoil 34 of the first workpiece 26 may be made slightly wider to permit blending of a diffusion bond line. Also, the bladed disc assembly 24 is fabricated from dissimilar material, for example. components made of a composite material which cannot be satisfactorily joined through a friction welding.

In addition the method and process enables joining of components that are currently effectively impossible to inertia weld because or inertia required to join them being significantly in excess of the inertia available on the largest machine commercially available. Advantageously, the capital infrastructure required to join these components is lowered.

Further, by providing a second or fourth workpiece which has a different hardness to the other workpiece, or the third workpiece it is possible to tailor the proportion of the upset which comes from either material. For example the tailoring could ensure that a greater proportion of the upset comes from the harder material which permits a greater elimination of any surface material or impurities from the harder material.

The use of a second and/or fourth workpiece could, e.g. by adding a material that is chemically or visually distinct from the parent alloys of the first, third or fifth workpieces, tenable a quality control inspection of the flash either in-situ or post-weld for evidence of the added material.

Further, the proposed disclosure facilitates joining of ceramic or ceramic based workpiece to a metallic workpiece. The proposed disclosure is also applicable for joining inter-metallic materials to a metallic, or joining of bladed discs with hollow cavities 47 within the blade 26, or joining of bladed discs with a discontinuity in shape or construction within the blade 26. Where the cavity 47 opens to the first surface 46, as shown in FIG. 3B, the diffusion bonding of the second surface 50 may be used to provide a suitable surface for friction welding. Other techniques to join the first and second surface may not be sufficiently robust to withstand the pressures of the friction welding or may leave impurities in the join that are detrimental to the properties of the join.

It will be appreciated by one skilled in the art that, where technical features have been described in association with one embodiment, this does not preclude the combination or replacement with features from other embodiments where this is appropriate. Furthermore, equivalent modifications and variations will be apparent to those skilled in the art from this disclosure. Accordingly, the exemplary embodiments of the disclosure set forth above are considered to be illustrative and not limiting.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method for fabricating an integral assembly, the method comprising:
   providing a first workpiece having a first surface and a second workpiece having a second surface, wherein the first workpiece has a cavity opening to the first surface, and wherein the second workpiece is manufactured from a wrought or a cast material;
   performing a diffusion bonding process between the first surface of the first workpiece and the second surface of the second workpiece to form a sub-assembly workpiece, wherein the diffusion bonding process between the first surface and the second surface closes the cavity; and
   performing a friction welding process between a third surface of the sub-assembly workpiece and a fourth surface of a third workpiece to form the integral assembly,
   wherein material properties of the first workpiece being different from material properties of the third workpiece.

2. A method according to claim 1, wherein the integral assembly is selected from a group comprising bladed discs, bladed drums and/or bladed rings.

3. A method according to claim 1, wherein the second bonding process comprises a linear friction welding, or an orbital friction welding.

4. A method according to claim 1, wherein the first workpiece is manufactured from a single-crystal nickel super alloy, or a directional solidification (DS) super alloy.

5. A method according to claim 1, further comprising performing a machining, a surface treatment and a heat treatment.

6. A method of fabricating a bladed disc for a gas turbine, the method comprising:
- providing a sub-assembly workpiece formed from a first workpiece diffusion bonded to a second workpiece, wherein the first workpiece has a cavity opening to the first surface, and wherein the second workpiece is manufactured from a wrought or a cast material, wherein the second workpiece closes the cavity; and
- performing friction welding between a third surface of the sub-assembly workpiece and a fourth surface of a third workpiece to form the bladed disc,
- wherein material properties of the first workpiece being different from material properties of the third workpiece.

7. A method according to claim 6, wherein the first workpiece is a blade, and the third workpiece is a disc.

8. A method according to claim 7, wherein the sub-assembly workpiece is formed by diffusion bonding the first workpiece and the second workpiece.

9. A method according to claim 8 wherein the second bonding process comprises a linear friction welding, or an orbital friction welding.

10. A method according to claim 6, wherein the first workpiece is manufactured from a single-crystal nickel super alloy, or a directional solidification (DS) super alloy.

11. A bladed disc comprising:
- a first workpiece;
- a second workpiece; and
- a third workpiece,
- wherein the first workpiece is coupled to the third workpiece using the second workpiece to form the bladed disc, the second workpiece is disposed in between the first workpiece and the third workpiece to facilitate coupling of the first workpiece, and the third workpiece, wherein the first workpiece is coupled to the second workpiece by diffusion bonding and the second workpiece is coupled to the third workpiece by friction welding, the material properties of the first workpiece being different from material properties of the third workpiece, wherein the first workpiece has a cavity opening to a surface to which the second workpiece is coupled, wherein the second workpiece closes the cavity, and wherein the second workpiece is manufactured from a wrought or a cast material.

12. A bladed disc of the claim 11, wherein the first workpiece is a blade, and the third workpiece is a disc.

13. A bladed disc according to claim 11, wherein the second bonding process comprises a linear friction welding, or an orbital friction welding.

14. A bladed disc according to claim 11, wherein the first workpiece is manufactured from a single-crystal nickel super alloy, or a directional solidification (DS) super alloy.

15. A gas turbine engine comprising a bladed disc, the bladed disc comprising:
- a first workpiece;
- a second workpiece; and
- a third workpiece,
- wherein the first workpiece is coupled to the third workpiece using the second workpiece to form the bladed disc, the second workpiece is disposed in between the first workpiece and the third workpiece to facilitate coupling of the first workpiece, and the third workpiece wherein the first workpiece is coupled to the second workpiece by diffusion bonding and the second workpiece is coupled to the third workpiece by friction welding, the material properties of the first workpiece being different from material properties of the third workpiece, wherein the first workpiece has a cavity opening to a surface to which the second workpiece is coupled, wherein the second workpiece closes the cavity, and wherein the second workpiece is manufactured from a wrought or a cast material.

* * * * *